United States Patent
Anderson et al.

(10) Patent No.: US 9,066,363 B2
(45) Date of Patent: Jun. 23, 2015

(54) METHODS AND APPARATUS FOR MITIGATING INTERFERENCE BETWEEN CO-LOCATED COLLABORATING RADIOS

(75) Inventors: Jeff S. Anderson, Itasca, IL (US); Henry W. Anderson, Palatine, IL (US); Bradley M. Hiben, Glen Ellyn, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 155 days.

(21) Appl. No.: 13/340,057

(22) Filed: Dec. 29, 2011

(65) Prior Publication Data

US 2013/0170439 A1   Jul. 4, 2013

(51) Int. Cl.
*H04W 4/00* (2009.01)
*H04W 72/12* (2009.01)

(52) U.S. Cl.
CPC ...... *H04W 72/1215* (2013.01); *H04W 72/1284* (2013.01)

(58) Field of Classification Search
CPC ....... H04W 4/20; H04W 40/08; H04W 84/22; H04W 40/02; H04W 74/002; H04W 28/22; H04W 80/06; H04L 1/0002; H04L 1/0015; H04L 45/123; H04L 47/14
See application file for complete search history.

(56) References Cited

U.S. PATENT DOCUMENTS

| | | |
|---|---|---|
| 7,593,691 B2 | 9/2009 | Karabinis |
| 7,860,521 B2 | 12/2010 | Chen et al. |
| 8,504,090 B2 | 8/2013 | Klein et al. |
| 8,731,568 B1 | 5/2014 | Epstein et al. |
| 2006/0114864 A1 | 6/2006 | Fuccello et al. |
| 2006/0292986 A1 | 12/2006 | Bitran et al. |
| 2009/0170542 A1* | 7/2009 | Chen et al. .............. 455/501 |
| 2010/0029289 A1 | 2/2010 | Love et al. |
| 2010/0054158 A1* | 3/2010 | Mathai et al. .............. 370/259 |

(Continued)

FOREIGN PATENT DOCUMENTS

| | | |
|---|---|---|
| EP | 1395024 A2 | 2/2004 |
| WO | 2010039562 A1 | 4/2010 |

(Continued)

OTHER PUBLICATIONS

"Wi-Fi™ and Bluetooth™—Interference Issues," HP Invent, pp. 6, Jan. 2002.

(Continued)

*Primary Examiner* — Chi H Pham
*Assistant Examiner* — Raul Rivas
(74) *Attorney, Agent, or Firm* — Steven A. May (57) ABSTRACT

Methods and apparatus are provided for mitigating interference between spectrally distinct wireless communication networks employing co-located, collaborating radios. A first base station is in a first network and communicates with a first radio within a first frequency range, and a second base station is in a second network and communicates with a second radio in a second frequency range. The first and second radios are geographically co-located, for example, within a public safety vehicle. The first radio determines a maximum level of interference it will accept based on current operational parameters, and communicates a corresponding threshold value to the second radio through a data link. The second radio sends a request to its base station to employ interim scheduling constraints governing uplink transmissions from the second radio, to thereby limit out of band emissions received by the first radio to a range that is less than the threshold interference level.

16 Claims, 6 Drawing Sheets

(56) References Cited

U.S. PATENT DOCUMENTS

| | | | |
|---|---|---|---|
| 2010/0056136 A1 | 3/2010 | Zhu | |
| 2010/0081449 A1 | 4/2010 | Chaudhri et al. | |
| 2010/0128689 A1 | 5/2010 | Yoon et al. | |
| 2010/0195584 A1 | 8/2010 | Wilhelmsson et al. | |
| 2010/0304705 A1* | 12/2010 | Hursey | 455/404.1 |
| 2010/0319033 A1 | 12/2010 | Auranen et al. | |
| 2011/0136497 A1* | 6/2011 | Youtz et al. | 455/452.2 |
| 2011/0243047 A1 | 10/2011 | Dayal et al. | |
| 2012/0164948 A1 | 6/2012 | Narasimha et al. | |

FOREIGN PATENT DOCUMENTS

| | | |
|---|---|---|
| WO | 2010112066 A1 | 10/2010 |
| WO | 2011072884 A1 | 6/2011 |

OTHER PUBLICATIONS

PCT International Search Report Dated May 2, 2013 for Counterpart Application PCT/US2012/069278.

Motorola Solutions: "B26 Downlink LTE to PS Co-Existence", 3GPPDraft; R4-113744 B26 DL LTE To PS Co-Existance, 3rd Generation Partnership Project (3GPP), Mobile Competence Centre, France, vol. RAN WG4, No. Roma; 20110627, Jun. 22, 2011, XP050542860.

Motorola Solutions: "Co-Existence Issue for 700MHz Digital Divident Band", 3GPP Draft;.R4-113746_Co-Existance Issue for 700 MHz DD, 3rd Generation Partnership Project (3GPP), Mobile Competence Centre, France, vol. RAN WG4, No. Roma; 20110627, Jun. 22, 2011, XP050542862.

PCT International Search Report Dated Mar. 6, 2013 for Related Application PCT/US2012/062574.

PCT International Search Report Dated May 21, 2013 for Related Application PCT/US2013/021045.

Xiangpeng Jing: "Spectrum Coordination 1-20 Protocols and Algorithms for Cognitive Radio Networks",3' Jan. 1, 2008 (Jan. 31, 2008), XP055043291, Retrieved from the Internet:URL:http://www.google.de/url?sa=t&rct=j&q=spectrum%20co-ordination%20protocols%20and%20algorithms%20for%20cognitive%20radio%20networks&source=web&cd=l&cad=rja&ved=0CCEQFjAA&url=http%3A%2F%2Fmss3.libraries.rutgers.edu%2Fdlr%2Foutputds.php%3Fpid%3Drutgers-lib%3A24143%26mime%3Dapplication%2Fpdf%26ds%3DPDF-1.

Xiangpeng Jing et al: 'Distributed Coordination Schemes for Multi-Radio Co-existence in Dense Spectrum Environments: An Experimental Study on the ORBIT Testbed', NE\</ Frontiers in Dynamic Spectrum Access Networks, 2008. DYSPAN 2008. 3rd IEEE Symposium On, IEEE, Piscataway, NJ, USA, Oct. 14, 2008, pp. 1-10, XP031353263, ISBN: 978-1-4244-2016-2. abstract paragraph [001.]—paragraph [III.].

Xiangpeng Jing et al: 'Spectrum co-existence of IEEE 802.llb and 802.16a networks using the CSCC etiquette protocol',2005 1ST IEEE International Symposium on New Frontiers in Dynamic Spectrum Access Networks, IEEE, Baltimore, MD, USA, Nov. 8, 2005, pp. 243-250, XP010855121, DOI: 10.1109/DYSPAN.2005.1542640 ISBN: 978-1-4244-0013-3 abstract sentence I .—sentence I I I.

* cited by examiner

METHODS AND APPARATUS FOR MITIGATING INTERFERENCE BETWEEN CO-LOCATED COLLABORATING RADIOS

FIELD OF THE DISCLOSURE

The present disclosure relates generally to wireless communication base stations and mobile devices, and more particularly to methods and apparatus for mitigating out of band emissions among user equipment and base stations operating at geographically co-located and spectrally distinct wireless communication systems.

BACKGROUND

Hurricanes, tornadoes, floods, and other natural disasters, as well as other life-threatening emergencies, underscore the need for a robust communications infrastructure for use by local, state, and federal emergency response teams. Police departments, fire departments, "911" call centers and other law enforcement personnel increasingly rely upon mobile wireless communication devices (also referred to herein as "user equipment" or "UE"), typically dash-mounted or handheld radios, to coordinate first response and "on scene" rescue efforts with citizens, dispatchers, and fellow public safety organizations.

The proliferation of cellular telephones, radios, and other broadband communication devices, and the rapidly advancing standards and protocols for their use, places a premium on the limited bandwidth allocated for public safety applications. This requires system designers and regulators to utilize bandwidth more efficiently and to intelligently engineer available spectrum, without compromising the life-saving missions of these emergency response agencies.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The Federal Communications Commission (FCC) is responsible for allocating the finite radio frequency spectrum among various government entities, cellular telephone and data carriers, and a host of competing corporate and individual interests. In that capacity, the FCC has allocated certain frequency bands for use by and for the benefit of local, state, and national public safety organizations and applications.

In particular, the frequency band including 799 to 805 megahertz (MHz) and paired with 769 to 775 MHz has been allocated for public safety (PS) narrowband (NB) voice communications by police, fire, and other emergency response teams. These frequencies support "push-to-talk" land mobile radio (LMR) two-way radio devices used by law enforcement agencies across the country.

The FCC has also designated the frequency band from 793 to 798 MHz and paired with 763 to 768 MHz for broadband public safety transmissions. The FCC has mandated the use of 3GPP Long Term Evolution technology (referred to herein as LTE) in this broadband spectrum. This corresponds to the upper portion of the 3GPP evolved universal mobile telecommunications system terrestrial radio access (E-UTRA) operating band 14 of the frequency spectrum.

The FCC has also designated the frequency band from 787 to 788 MHz and paired with 746 to 756 MHz (referred to as operating band 13 and also expected to be LTE compliant) for broadband operations, and public operators are the primary operators within this range.

The FCC has also designated the frequency band from 788 to 793 MHz and paired with 758 to 763 MHz for broadband operations (possibly with shared access) for public safety transmissions, which may also be mandated as LTE compliant. This corresponds to the lower portion of the 3GPP E-UTRA operating band 14.

Because the foregoing commercial operator spectrum allocations are spectrally near the legacy narrow band voice band, some of the energy from the LTE network may "leak" into the LMR network. Under certain conditions, this leakage, known as out of band emissions (OOBE), may cause undesirable radio interference to communications between an LMR base station and one or more of its mobile devices, particularly when the LMR mobile device is geographically co-located (e.g., in the same police car or fire truck) with the interfering LTE mobile device (mobile station). Those skilled in the art will appreciate that radio frequency tuning equipment, such as band pass filters, can selectively determine a desired frequency range to be transmitted; however, they are expensive and typically cannot eliminate OOBE entirely.

Accordingly, there is a need for methods, systems and apparatus for mitigating interference caused by OOBEs, particularly in public safety networks.

In accordance with the disclosed embodiments, methods, systems and apparatus are provided for mitigating OOBE between spectrally distinct wireless communications networks.

In accordance with an embodiment, a legacy public safety narrow band voice network includes an LMR base station (BS) and a plurality of NB mobile devices used by police officers, firefighters, and other emergency response personnel to communicate with each other, dispatchers, and various responding agencies. A broadband network deployed in a nearby frequency band includes an LTE (Long Term Evolution) base station (eNB) and a plurality of LTE Vehicular Subscriber Modems (VSM), also referred to as LTE user equipment (UE).

Transmissions between an LTE VSM and its LTE eNB may result in undesirable OOBE at a co-located LMR mobile device. By establishing a data link between the co-located LMR and LTE mobile devices, steps can be taken to reduce the interference, for example, by executing a mitigation protocol. In this regard, the LTE network can make adjustments to mitigate or avoid the interference. For example, the power level or transmission frequency of the interfering signal may be adjusted. In addition, the LTE base station can vary the number, timing, and location of resource blocks within the LTE traffic channel to cause less OOBE to reach the LMR receiver. Alternatively, the LTE transmission may be paused, terminated and/or rescheduled in accordance with a predetermined prioritization hierarchy.

Figure 1:
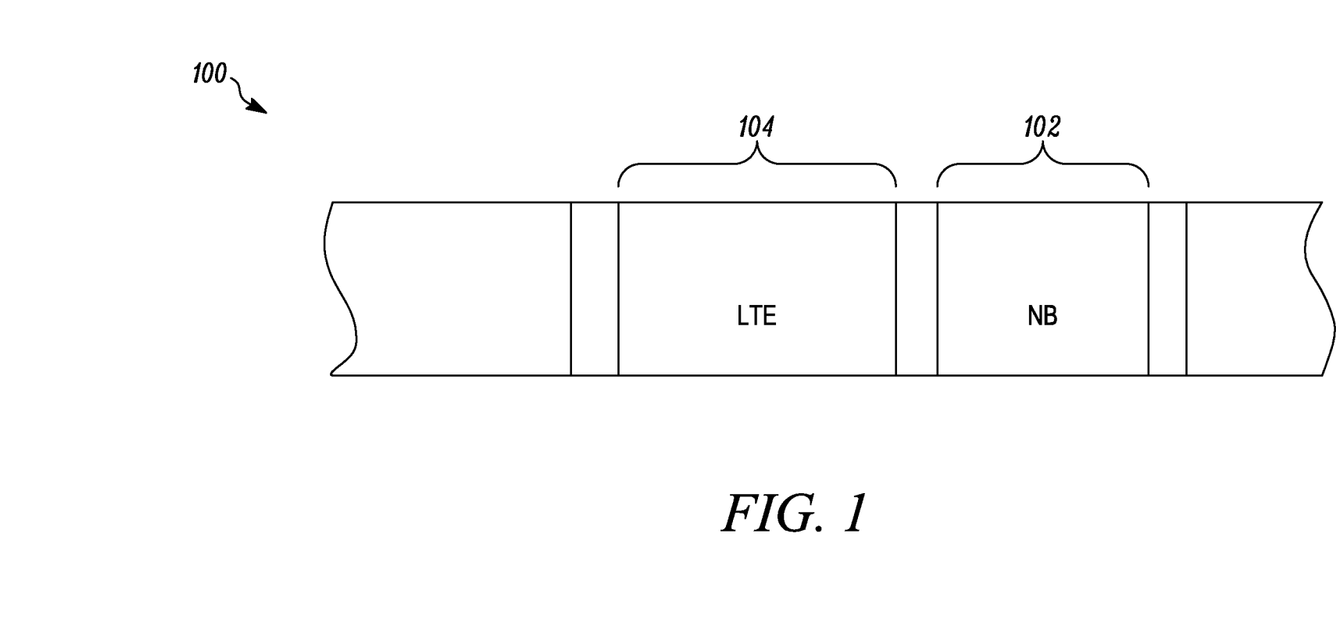
FIG. 1 illustrates a portion of the electromagnetic spectrum including bandwidths allocated to public safety applications in accordance with some embodiments.

FIG. 1 is a segment 100 from the radio frequency (RF) portion of the electromagnetic spectrum illustrating two exemplary frequency bands that are adjacent to or nearby each other, and that are spectrally distinct. More particularly, public safety (PS) narrow band (NB) band 102 may include frequencies ranging from 769 megahertz to 805 MHz, and particularly in the range of 769 to 775 MHz. A nearby (or adjacent) band 104 may include frequencies ranging from 776 megahertz to 799 MHz, and is allocated to broadband, LTE compliant public safety communications and applications. In particular, band 104 may include, inter alia, one or more of the following bands: 776 to 787 MHz, 788 to 793 MHz, and 793 to 799 MHz.

Figure 2:
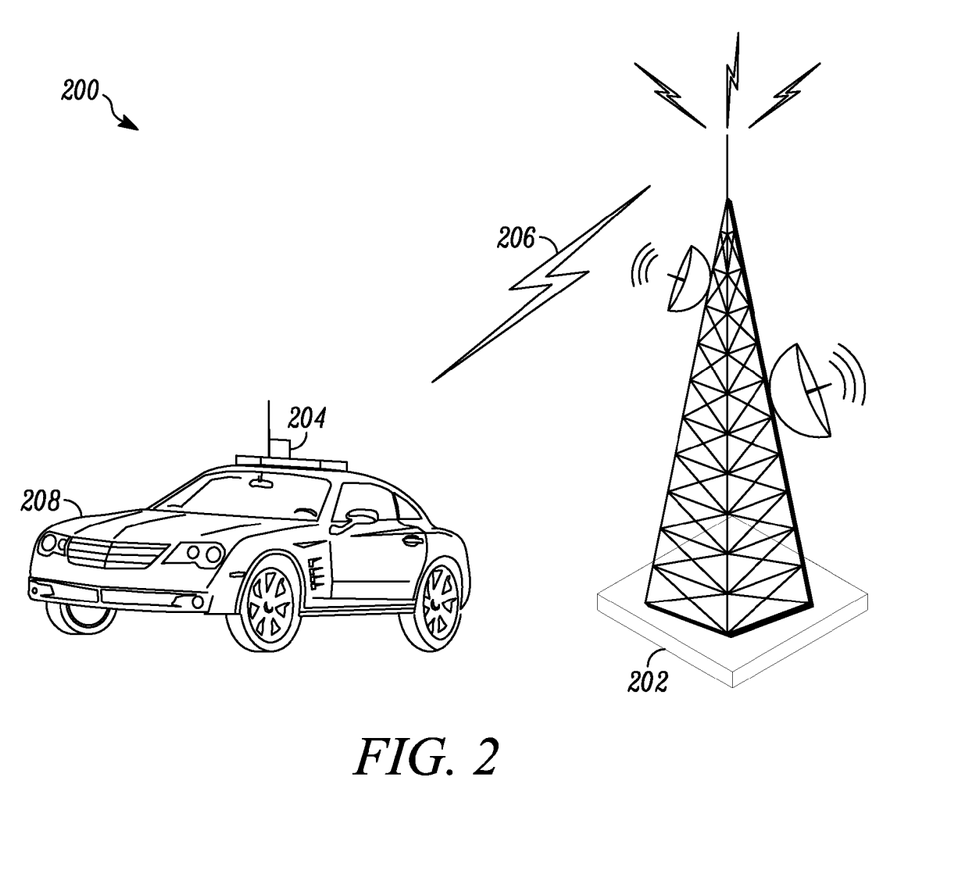
FIG. 2 illustrates an exemplary emergency response vehicle and associated base station in accordance with some embodiments.

FIG. 2 illustrates a portion of an exemplary legacy public safety voice band wireless network 200 including a base station 202 and a mobile station 204. It should be appreciated that the wireless networks described herein may contain any number of base stations and associated wireless mobile devices. In FIG. 2, mobile station 204 is illustrated as a box with a simple antenna mounted atop an emergency response vehicle 208, for example a police car. Mobile station 204 may also include a transmitter, receiver, processor, memory, user input and output hardware, and the like (not shown). Mobile station 204 may be dash-mounted, hand-held, or removably or permanently affixed to vehicle 208.

In operation, network 200 may employ any desired modulation scheme in any desired frequency range to transmit data packets 206 from base station 202 to mobile station 204 (known as the downlink or DL), and from mobile station 204 to base station 202 (known as the uplink or UL).

One or more of the various mobile wireless communication devices discussed herein, such as mobile station 204, may be, for example, a portable/mobile radio, a personal digital assistant, a cellular telephone, a video terminal, a portable/mobile computer with a wireless modem, or any other wireless communication device. For purposes of this description, such a mobile wireless communication device may also be referred to as a subscriber unit, a mobile station, mobile equipment, a handset, a mobile subscriber, a vehicular subscriber modem, user equipment (UE), or an equivalent used in accordance with any known standards or protocols. In addition, although not illustrated, such mobile devices may include a Global Positioning System (GPS) capability that allows it to determine GPS coordinates that specify its geographic location. As is well-known in the art, a GPS receiver receives signal information transmitted from a GPS transmitter, and a GPS processor in the mobile device uses this information along with triangulation processing techniques to calculate its geographic location, which can be specified as a latitude coordinate, a longitude coordinate and, optionally, an altitude coordinate.

It should also be noted that various wireless communication networks discussed herein can generally be any type of voice, data, and/or broadband radio access network, and that specific non-limiting examples are described herein, where one or more of the broadband radio access networks is a narrow band voice network or a Long Term Evolution (LTE) compliant network that operates in accordance with LTE standards.

As will be appreciated by those skilled in the art, "LTE" refers to an ongoing standards development effort within the 3rd Generation Partnership Project (3GPP), which develops specifications to define improvements to the Universal Mobile Telecommunications System (UMTS), which is described in a suite of Technical Specifications (TS) developed within and publicized by the 3GPP. As of this writing, the most recent version of the 3GPP TSs were published in June, 2011. Enhancements to the UMTS that are described in the LTE standards were first introduced beginning with 3GPP Release 8. 3GPP Release 8 describes an architecture referred to as the Evolved Packet System (EPS), which includes an Evolved UTRAN (E-UTRAN) on the radio access side and an Evolved Packet Core (EPC) on the core network side.

Other infrastructure devices that may be included in the networks described herein include switches, zone controllers, base station controllers, repeaters, access points, routers, and the like. For sake of brevity these and other details will not be further described herein.

Figure 3:
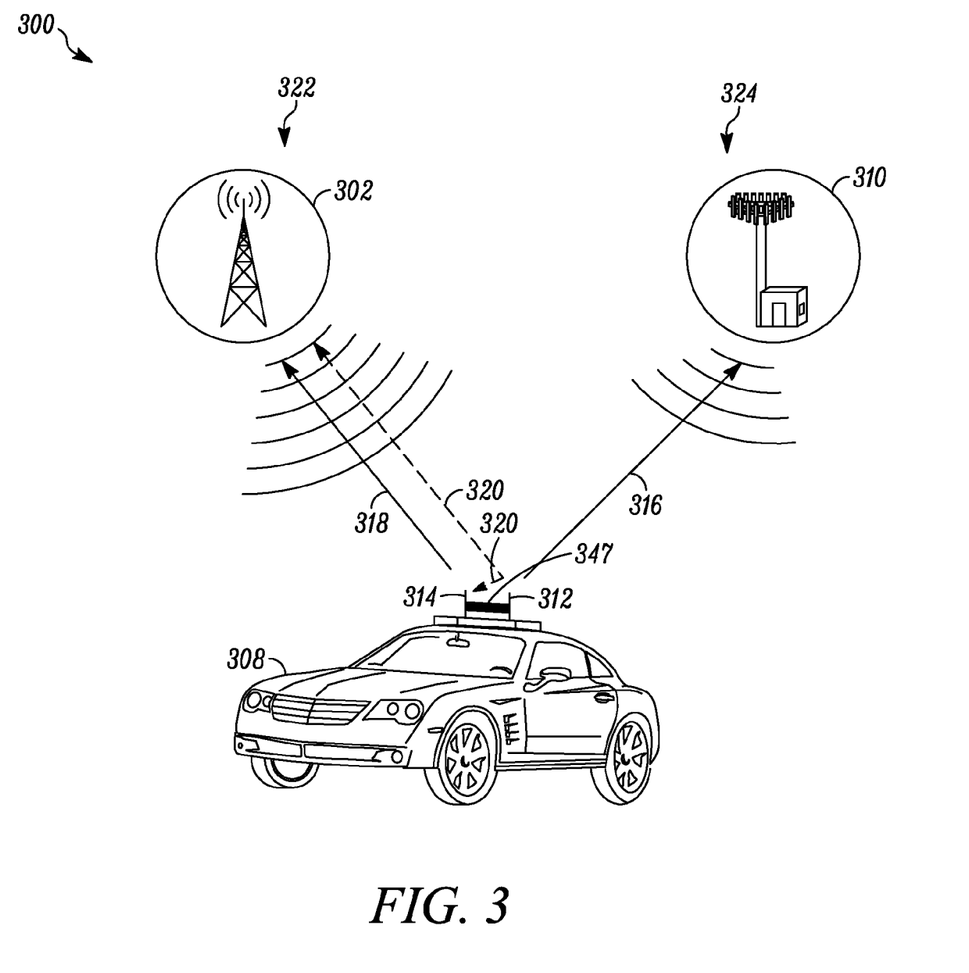
FIG. 3 illustrates spectrally adjacent wireless base stations and their associated wireless mobile devices co-located in a public safety vehicle in accordance with some embodiments.

Referring now to FIG. 3, a system 300 for mitigating interference between user equipment of geographically co-located and spectrally distinct wireless networks is shown. More particularly, a first network 322 (e.g., an LMR network) includes a base station 302 and one or more mobile stations (MS) 314. As shown, one such mobile station is located in a public safety vehicle 308. A second network 324 (e.g., an LTE network) includes a base station 310 and one or more mobile stations (user equipment (UE)) 312. In an embodiment, first mobile station 314 communicates with (e.g., is connected) to second mobile device (UE) 312 through a data link 347 that may be, for example, a dedicated wired or wireless data link such as a communication link compliant with a Bluetooth™ standard, universal serial bus (USB), or other suitable communications link. In this way, the two mobile devices may be regarded as collaborating radios.

First network 322 operates within a first frequency band (e.g., band 102, FIG. 1) and employs a first modulation scheme. Second network 324 operates within a second frequency band (e.g., band 104, FIG. 1) and employs a second modulation scheme. In accordance with LTE standards, second network 324 employs an orthogonal frequency division multiple access (OFDMA) modulation scheme, for example, single carrier frequency division multiple access (SCFDMA). In an embodiment, the first and second bands are spectrally adjacent or otherwise close to each other; that is, the two bands correspond to adjacent or nearby frequency bands in the RF spectrum.

With continued reference to FIG. 3, mobile devices 312 and 314 are geographically co-located, meaning that they are temporarily or permanently physically located at the same location, for example, in the same vehicle, worn or carried by the same person or two persons in close proximity to each other, or in two separate vehicles that are transiently proximate one another. In the embodiment illustrated in FIG. 3, they are co-located within vehicle 308.

In operation, a signal 316 is transmitted between mobile device 312 and base station 310 within network 324. When a channel upon which packet 316 is transmitted is near the edge of the band allocated to the first network 322, some of the energy associated with the transmission of packet 316 may spill into network 322, resulting in an unintended interfering signal 320 (shown as a dashed arrow for clarity) representing interference from mobile device 314 and manifesting at mobile device 314 (and possibly manifesting at base station 302 as well).

Interfering signal 320 manifests as an OOBE in network 322. In accordance with an embodiment, by establishing a communication path between mobile devices 312 and 314, the operational parameters associated with uplink transmission 316 may be adjusted to mitigate interference from signal 320, as needed.

Figure 4:
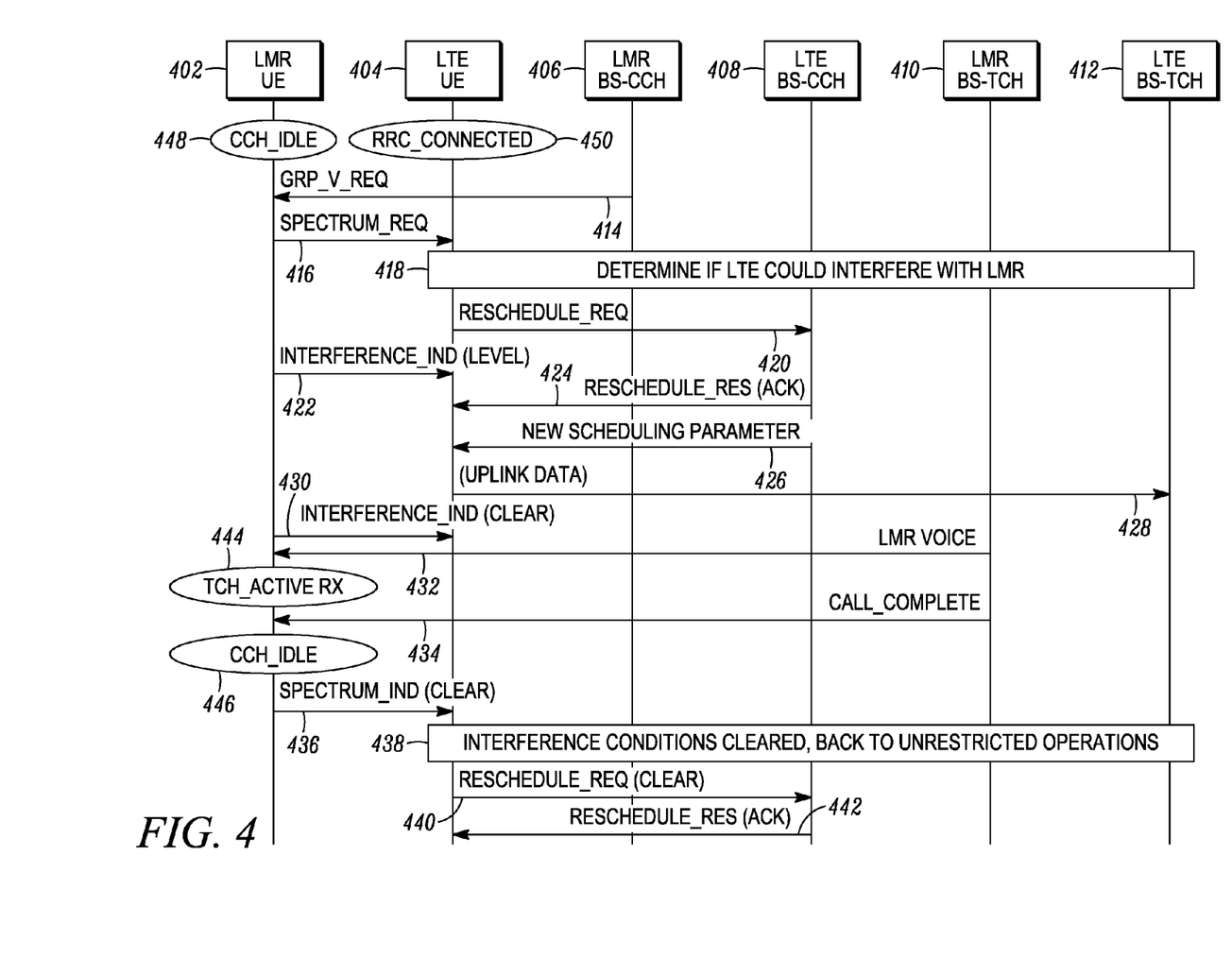
FIG. 4 is a message sequence chart in which a request to constrain a scheduled transmission is acknowledged in accordance with some embodiments.

Referring now to FIG. 4, a message sequence chart illustrating the interaction between an LMR network (e.g., network 322, FIG. 3) and an LTE network (e.g., network 324, FIG. 3) in accordance with an embodiment is shown. Traditional LMR communication networks may be of two types: conventional and trunked. In a conventional LMR network, the user controls access to the channel. In a trunked LMR system, the base station controls channel access.

More particularly, a trunked LMR system includes a signaling channel, also referred to as a control channel, and multiple payload channels. To initiate a call, the LMR mobile device user presses the PTT ("push to talk") button, thereby sending a signal to the base station, the signal including the mobile device user ID, group ID, and a call request. In response, the LMR base station broadcasts a control channel signal to all mobile devices associated with the designated talk group announcing the initiation of a call. Those mobile devices belonging to the designated group (i.e., having the same group ID) tune to the corresponding payload frequency, and the call is commenced.

In an LTE network, the base station schedules all transmissions for the various mobile devices associated with the LTE base station. Recognizing that mission critical voice transmissions in the LMR network generally have the highest priority in a public safety context, in accordance with some embodiments of the present disclosure the LTE base station attempts to accommodate the LTE mobile device's request to adjust operational parameters to mitigate interference between the LTE mobile device and a co-located LMR mobile device.

More particularly, when an LMR mobile device is advised by its LMR base station that a call is being initiated, the LMR radio sends an alert signal to its co-located LTE radio, including an indication of the maximum amount of interference the LMR radio can accept from the LTE radio without the OOBE from the LTE UE resulting in interference to the narrow band call at the co-located LMR mobile device. In response, the LTE radio first calculates, estimates, or otherwise determines appropriate RF parametric values that will satisfy the LMR radio's request, and then provides sends preferred parametric values to its LTE base station to schedule its uplink transmissions in a manner that satisfies the maximum interference level requirement defined by the LMR device.

In an alternate embodiment, the LMR and LTE radios do not communicate with each other. Rather, the LTE radio is configured to adhere to a predetermined frequency band and/or interference level established for its collocated LMR radio.

Returning now to FIG. 4, an exemplary LMR network includes an LMR mobile station (LMR UE) 402 and an LMR base station having an LMR control channel 406 and an LMR traffic channel 410. An LTE network includes an LTE mobile device (LTE UE) 404 and an LTE base station having an LTE control channel (CCH) 408 and an LTE traffic channel (TCH) 412. As shown, the LMR mobile station control channel is initially idle (state 448), and the LTE UE's radio resource control (RRC) protocol layer is initially in the connected state (state 450).

When LMR UE 402 is about to receive a call) or otherwise desires to establish or maintain communication), either because it previously requested a call or because another LMR MS of the same user group requested a call, LMR UE 402 receives a group voice request (GRP_V_REQ) signal 414 on LMR base station control channel 406. In response, LMR UE 402 sends a spectrum request (SPECTRUM_REQ) signal 416 to LTE UE 404 over data link 347 (see FIG. 3). The spectrum request signal 416 informs LTE UE 404 of the maximum amount of OOBE that LMR UE 402 can receive resulting from uplink transmissions from LTE UE 404 to its LTE base station. Thus, spectrum request 416 essentially constitutes a request to LTE UE 404 to adjust its uplink transmission parameters so that OOBE resulting therefrom is kept below a threshold value during the period in which LMR UE 402 engages in communications with its LMR base station.

In a further embodiment, spectrum request signal 416 may also include certain service parameters such as TDMA timing, frequency of reception, and permitted noise rise (based on knowledge of current RSSI and known SNR requirements). These may then be used to calculate the broadband transmitter frequency, power, and duty cycle in such a manner as to avoid interference due to transmitter OOBE or receiver blocking. In this context, blocking refers to an interference mechanism wherein a receiver loses sensitivity due to a large off-channel signal. Blocking is different from OOBE in that OOBE relates to power from a transmitter that is actually outside of the transmitter's channel, and increases the noise level on nearby frequencies.

Upon receiving spectrum request 416, the LTE UE 404 determines if current operational parameters associated with uplink transmissions from LTE UE 404 will interfere with the anticipated LMR voice communications (task 418). However, uplink transmissions from LTE UE 404 to the LTE base station are scheduled by the LTE base station; that is, the LTE base station determines the transmission parameters of the uplink transmissions. Accordingly, LTE UE 404 transmits a reschedule request (Reschedule_Req) 420 (also referred to herein as an interim scheduling request) to the LTE base station 408 requesting the LTE base station to adjust one or more of the following operational parameters for uplink transmissions from LTE UE 404: transmission frequency, transmission bandwidth (BW), transmission power level, and transmission TDM (time domain multiplexing) cycle.

LMR UE 402 measures the actual level of OOBE received by LMR UE 402 resulting from uplink transmissions from LTE UE 404 and then sends an interference indication signal (INTERFERENCE_IND(LEVEL)) 422 to LTE UE 404 indicative of the actual level of OOBE. In the example illustrated in FIG. 4, the LTE base station 408 determines (task 418) that it can accommodate the interim scheduling request 420, and sends a reschedule response signal (RESCHEDULE_RES (ACK)) 424 to LTE UE 404. The LTE base station 408 then sends a signal(s) 426 to LTE UE 404 containing the new scheduling parameters (NEW SCHEDULING PARAM- ETER). LTE UE 404 thereafter transmits uplink data 428 in accordance with the new (interim) scheduling parameters.

The LMR traffic channel remains active (state 430) for the duration of the voice call. When the LMR voice call is complete (Call_Complete) (message 434), LMR UE 402 control channel function enters idle mode (state 446), and LMR UE 402 sends a spectrum indication signal (SPECTRUM_IND (CLEAR)) 436 to LTE UE 404 informing the LTE network that the voice call has terminated. Once the interim interference conditions are cleared by the LMR UE 402 (state 438), the LTE network may safely resume unrestricted operations. LTE UE 404 sends a control signal (RESCHEDULE_REQ (CLEAR)) 440 to the LTE base station 408 confirming that interim scheduling parameters are no longer needed. In response, the LTE base station 408 sends a control signal (RESCHEDULE_ES (ACK)) 442 to LTE UE 404 acknowledging the resumption of unrestricted operations.

In the foregoing example (Case 1), the LTE base station 408 was able to schedule (i.e., adjust) the parameters governing uplink transmissions from the LTE UE 404 to the LTE base station 408 to ensure that the OOBE level received at LMR UE 402 was less than the maximum acceptable level. In the example illustrated in FIG. 5 (Case 2), the LTE base station determines that it is not able to reschedule uplink transmissions in such a way as to limit OOBE to within the threshold value requested by the LMR radio.

Figure 5:
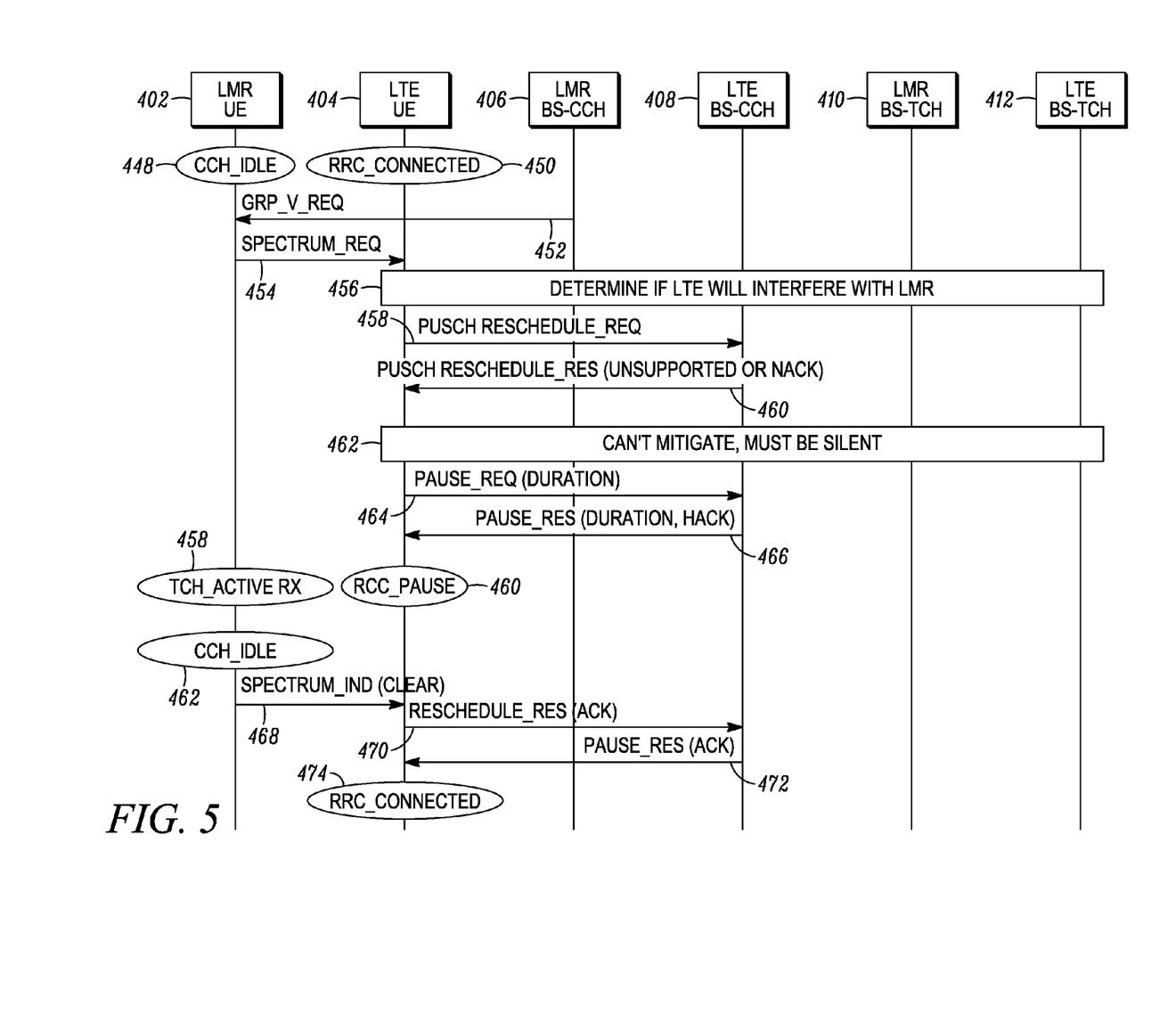
FIG. 5 is a message sequence chart in which a request to constrain a scheduled transmission is not acknowledged in accordance with some embodiments.

Referring now to FIG. 5, the LMR base station sends a group voice request (GRP_V_REQ) signal 452 to LMR UE 402 indicating that a voice call is about to begin. LMR UE 402 then sends a spectrum request (Spectrum_Req) 454 to LTE UE 404, informing the LTE radio of the maximum interference level that LMR UE 402 can accept. Upon receiving spectrum request 454, the LTE UE 404 determines if current operational parameters associated with uplink transmissions from LTE UE 404 will interfere with the anticipated LMR voice communications (task 456).

The LTE network then determines if it can satisfy the OOBE threshold defined in spectrum request 454. Specifically, LTE UE 404 sends a reschedule request signal (RESCHEDULE_REQ) 458 to the LTE base station and, in the example shown in FIG. 5, the LTE base station 408 determines that it cannot meet the interference threshold requirement. The LTE base station 408 therefore sends a reschedule response signal (RESCHEDULE_RES) 460 to LTE UE 404 indicating that the requested interim scheduling request is unsupported, i.e., the reschedule response signal is in the nature of a denial or NACK (not acknowledged) response.

Because the LTE base station 408 is unable to effectively mitigate uplink interference, LTE UE 404 temporarily enters a silent mode of operation (state 462). LTE UE 404 sends a pause request signal (PAUSE_REQ) 464 to the LTE base station 408, followed by a pause response signal (PAUSE_RES) 466 from the LTE base station 408 to LTE UE 404. The radio resource control (RRC) associated with LTE UE 404 remains paused (state 460) while the LMR traffic channel remains active (state 458) and the LMR control channel remains idle (state 462).

Upon termination of the LMR voice session (i.e., the LMR call ends), LMR UE 402 sends a spectrum indication (SPECTRUM_IND (CLEAR)) signal 468 to LTE UE 404, whereupon LTE UE 404 sends a pause clear (PAUSE_REQ (CLEAR)) signal 470 to the LTE base station followed by a pause response (PAUSE_RES (ACK)) signal 472 from the LTE base station to LTE UE 404 acknowledging termination of the pause state. The radio resource control feature associated with LTE UE 404 is then re-connected (state 474).

Figure 6:
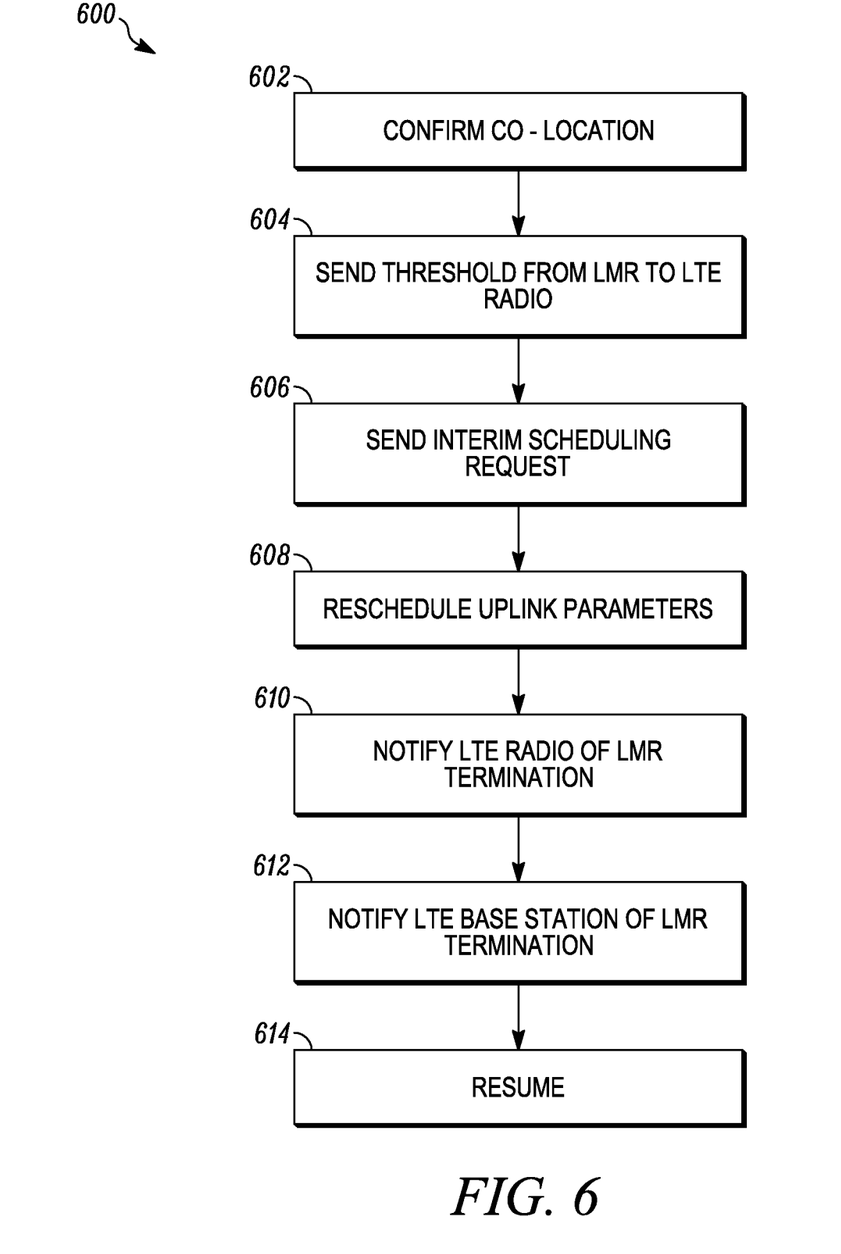
FIG. 6 is a flow chart illustrating a method of mitigating out of band interference received from an adjacent channel in accordance with some embodiments.

Referring now to FIG. 6, a method 600 for mitigating out of band emissions includes determining that an LMR mobile station and an LTE UE are co-located (task 602), for example by confirming that the two radios are located in the same vehicle, on the same person, or otherwise geographically proximate one another. When an LMR voice call is about to begin, the LMR radio provides (e.g., via data link 347, FIG. 3) the LTE radio with an indication of a maximum interference (task 604) under which the LTE radio is required to maintain OOBE associated with uplink transmissions.

In response to this request, the LTE radio sends an interim scheduling request to the LTE base station (task 606). If the LTE network is able to meet the threshold requirement, the LTE base station reschedules uplink parameters (task 608). The LMR radio notifies the LTE radio when the LMR voice call ends (task 610), whereupon the LTE radio advises the LTE base station of the termination of the LMR voice call (task 612). The LTE radio may then resume unconstrained uplink transmissions (task 614).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of mitigating an interfering radio signal, that is received at a first mobile device configured to communicate with a first base station within a first frequency band, and which was transmitted by a second mobile device configured to communicate with a second base station within a second frequency band, the method comprising:
    the second mobile device receiving, from the first mobile device responsive to the first mobile device detecting initiation of a call within the first frequency band, information indicating a threshold value corresponding to a maximum amount of interference the first mobile device can accept from the second mobile device's uplink transmissions without interfering with the call at the first mobile device;
    the second mobile device, responsive to receiving the threshold value, determining preferred operational parameters associated with its uplink transmissions to the second base station that will satisfy the maximum amount of interference indicated by the threshold value, wherein said operational parameters include at least one of:
    frequency, bandwidth, and transmission power level;
    the second mobile device transmitting an interim scheduling request requesting adjustment to at least one current operational parameter associated with its uplink transmissions, as a function of the determined preferred operational parameters, to said second base station; and
    in response to transmitting the interim scheduling request, the second mobile device receiving an instruction from the second base station instructing the second mobile station to adjust its uplink transmissions to said second base station in accordance with the instruction; and
    wherein said first mobile device is a public safety land mobile radio (LMR) device and said second mobile device is wireless broadband subscriber modem.

2. The method according to claim 1, wherein determining the maximum amount of interference comprises determining an acceptable threshold level of out of band emissions (OOBEs).

3. The method according to claim 1, wherein said second mobile device and second base station are configured to communicate with each other using an orthogonal frequency division multiple access (OFDMA) modulation scheme.

4. The method according to claim 1, wherein communicating comprises communicating said information over a collaborative link between co-located radios.

5. The method according to claim 4, wherein said data link is a dedicated data link between the first and second mobile devices.

6. The method according to claim 4, wherein said data link comprises at least one of a Bluetooth™ compatible link and a universal serial bus (USB) connection.

7. The method according to claim 4, wherein said rescheduling comprises adjusting operational parameters associated with said uplink transmissions.

8. The method according to claim 4, wherein said rescheduling comprises pausing said uplink transmissions.

9. The method according to claim 1, wherein:
    said first mobile device is a public safety land mobile radio (LMR) device;
    said first base station is a public safety LMR base station; and
    said first mobile device receives on a narrow band channel in the range of 769 to 775 megahertz.

10. The method according to claim 1, wherein said second base station is a broadband base station, and said second mobile device is a broadband public safety radio device.

11. The method according to claim 10, wherein said second mobile device transmits on a broadband channel in the range of 777 to 798 megahertz.

12. The method according to claim 1, wherein said first and second mobile devices are co-located in a vehicle.

13. The method according to claim 1, wherein said first and second mobile devices are co-located on a person.

14. The method according to claim 1, wherein at least one of said first and second mobile devices is a hand-held unit, and further wherein at least one of said first and second mobile devices is mounted in an emergency response vehicle.

15. A method of mitigating out of band emissions received at a first radio that communicates with a first base station within a first frequency band, and
    which was transmitted by a second radio configured to communicate with a second base station within a second frequency band, the method comprising:

transmitting a first control signal from said first base station to said first radio to alert said first radio regarding an initiation of a call within the first frequency band forthcoming from said first base station to said first radio;

communicating a second control signal from said first radio to said second radio in response to said first control signal, the second control signal including information indicating a threshold value corresponding to a maximum amount of interference the first radio can accept from the second radio's uplink transmissions without interfering with the call at the first radio;

the second radio, responsive to receiving the second control signal, determining preferred operational parameters associated with its uplink transmissions to the second base station that will satisfy the maximum amount of interference indicated by the threshold value, wherein said operational parameters include at least one of: frequency, bandwidth, and transmission power level;

transmitting an interim scheduling request from said second radio to said second base station requesting adjustment to at least one current operational parameter associated with its uplink transmissions, as a function of the determined preferred operational parameters; and in response to transmitting the interim scheduling request, the second radio receiving an instruction from the second base station and the second radio executing an uplink transmission mitigation protocol in accordance with the instruction; and wherein said first mobile device is a public safety land mobile radio (LMR) device and said second mobile device is wireless broadband subscriber modem.

16. A system for mitigating radio interference from out of band emissions between land mobile radio (LMR) and 3GPPP long term evolution (LTE) mobile devices, comprising:

an LMR mobile device configured to communicate with a first base station in a first frequency range of 769 to 805 megahertz;

an LTE mobile device geographically co-located with said LMR mobile device and configured to communicate with a second base station in a second frequency range of 777 to 798 megahertz; and a data link connecting said LMR and LTE mobile devices and configured to communicate information indicating a threshold interference value from said LMR mobile device, responsive to the LMR mobile device detecting initiation of a call within the first frequency range, to said LTE mobile device, the threshold interference value corresponding to a maximum amount of interference the LMR mobile device can accept from the LTE mobile device's uplink transmissions without interfering with the call at the LMR mobile device;

wherein said LTE mobile device is configured, responsive to receiving said threshold interference value, to:

determine preferred operational parameters associated with its uplink transmissions to the second base station that will satisfy the maximum amount of interference indicated by the threshold value, wherein said operational parameters include at least one of: frequency, bandwidth, and transmission power level; and send an interim scheduling request to said second base station requesting adjustment to at least one current operational parameter associated with its uplink transmissions as a function of the determined preferred operational parameters.

* * * * *